United States Patent [19]
Kozuki et al.

[11] Patent Number: 5,589,943
[45] Date of Patent: Dec. 31, 1996

[54] APPARATUS FOR RECORDING DIGITAL STILL IMAGE SIGNALS AND ANALOG STILL IMAGE SIGNALS IN RESPECTIVE RECORDING AREAS

[75] Inventors: Susumu Kozuki, Tokyo; Isao Harigaya; Taizou Hori, both of Kanagawa-ken, all of Japan

[73] Assignee: Canon Kabushiki Kaisha, Tokyo, Japan

[21] Appl. No.: 303,122

[22] Filed: Sep. 7, 1994

Related U.S. Application Data

[63] Continuation of Ser. No. 927,213, Aug. 6, 1992, abandoned.

[30] Foreign Application Priority Data

| Aug. 20, 1991 | [JP] | Japan | 3-207829 |
| Sep. 2, 1991 | [JP] | Japan | 3-221706 |
| Oct. 21, 1991 | [JP] | Japan | 3-272626 |

[51] Int. Cl.$^6$ .......................... H04N 5/76; H04N 5/225; H04N 5/78
[52] U.S. Cl. .................. 386/121; 358/906; 358/909.1; 348/220; 386/124
[58] Field of Search ................... 358/335, 310, 358/906, 909.1; 348/207, 220; 360/33.1, 35.1; H04N 5/76, 5/78, 5/92, 5/225, 5/782

[56] References Cited

U.S. PATENT DOCUMENTS 5,097,363  3/1992  Takei et al. ..................... 358/906
5,187,616  2/1993  Kimura et al. ..................... 360/61
5,200,862  4/1993  Sato ..................... 360/10.1

FOREIGN PATENT DOCUMENTS

| 0439132 | 7/1991 | European Pat. Off. | H04N 5/782 |
| 1-212183 | 8/1989 | Japan | H04N 5/78 |
| 4-126480 | 4/1992 | Japan | H04N 5/782 |

*Primary Examiner*—Thai Q. Tran
*Attorney, Agent, or Firm*—Robin, Blecker, Daley & Driscoll

[57] ABSTRACT

An apparatus is arranged to record a video signal in first areas respectively provided in a multiplicity of tracks on a recording medium and also a digital still-image signal in second areas which are respectively separated from the first areas. In the apparatus, while the digital still-image signal is being recorded in the second areas, the video signal is always recorded in the first areas, whereby it is possible to prevent occurrence of an uncomfortable phenomenon, such as formation of a scene devoid of a substantial image, during reproduction from the first areas. In addition, an analog still-image signal, representative of an image identical to an image represented by the digital still-image signal recorded in the second areas, is repeatedly recorded in the first areas during a predetermined time duration, whereby it is possible to facilitate search of a still-image signal recorded in the second areas. In addition, the digital still-image signal is recorded in the second areas at intervals of a predetermined period during recording of an analog moving-image signal in the first areas, whereby it is possible to record as many still images as possible.

14 Claims, 13 Drawing Sheets

A: REGULAR RECORDING
B: OCCASIONAL RECORDING

A: REGULAR RECORDING
B: OCCASIONAL RECORDING

A: REGULAR RECORDING
B: OCCASIONAL RECORDING

PILOT SIGNAL

APPARATUS FOR RECORDING DIGITAL STILL IMAGE SIGNALS AND ANALOG STILL IMAGE SIGNALS IN RESPECTIVE RECORDING AREAS

This is a continuation application under 37 CFR 1.62 of prior application Ser. No. 07/927,213 filed on Aug. 6, 1992 (abandoned).

BACKGROUND OF THE INVENTION

1. Field of the Invention:

The present invention relates to a video signal recording apparatus and, more particularly, to a video signal recording apparatus for recording a digital still image signal and an analog video signal on the same recording medium.

2. Description of the Related Art:

In recent years, a demand for high-density recording has been increasing in the field of magnetic recording. To meet the demand, there has been provided a video tape recorder (VTR) of the type which is capable of effecting magnetic recording of high density by transporting a magnetic tape at a reduced speed.

However, a VTR provided with a fixed head for recording an audio signal has the disadvantage that if an audio signal is recorded on a magnetic tape which is being transported at the reduced speed, no large relative speed is obtained between the head and the tape and a sound of degraded quality is reproduced. As a means for solving this problem, a method has been proposed in which the length of each track scanned by a rotary head is extended with respect to the track length used in a conventional art and an audio signal, which is compressed along its time axis, is sequentially recorded in the additional portion of each extended track.

Such a method will be described below with reference to a VTR of the rotary 2-head helical scan type. In the conventional art, a magnetic tape is wrapped around a rotary cylinder through an angle which is slightly greater than 180 degrees. However, in the above-described method, a magnetic tape is wrapped around a rotary cylinder through an angle which is slightly greater than (180+θ) degrees. When an audio signal is to be recorded, the audio signal is converted into a PCM audio signal, and after the PCM audio signal has been compressed along its time axis, the resultant PCM audio signal is recorded on the extra θ-degree portion of the magnetic tape wrapped around the rotary cylinder.

FIG. 1 is a schematic view showing a tape transporting system for use in the above-described VTR. FIG. 2 is a schematic view showing the loci of recording formed on the magnetic tape by the VTR shown in FIG. 1.

Referring to FIG. 1, a solid line 1 represents a magnetic tape, and heads 3 and 4 are mounted on a rotary cylinder 2. As shown in FIG. 2, a plurality of tracks are formed on the magnetic tape 1, and each of the tracks includes an analog video signal recording area 5 and a digital signal recording area 6 in which a PCM audio signal is recorded. The analog video signal recording area 5 is traced by the head 3 or 4 during the rotation of the rotary cylinder 2 through an angular extent of 180 degrees, while the digital video signal recording area 6 is traced by the head 3 or 4 during the rotation of the rotary cylinder 2 through an angular extent of θ degrees.

As an applied example of the above-described method of recording a digital signal in one area while recording a video signal in another area, a method is proposed in which a still image is recorded in the aforesaid one area as a digital signal. In the case of a still image, it is possible to record all information representative of the still image on a magnetic tape by scanning a plurality of PCM (digital) signal recording areas 6. According to this method, it is possible to realize still-image photography utilizing a photographic apparatus and a recording medium both of which are of types identical to those used for moving-image photography. In addition, it is possible to provide a high-quality still image whose quality is higher than that of a still image obtainable by repeatedly reproducing an analog video signal from the same track on a magnetic tape in a conventional VTR while keeping the magnetic tape in a temporarily stopped state.

It has also been proposed to provide a video camera-integrated type VTR in which the above-described recording apparatus is incorporated in a camera-integrated type VTR so that still-image photography can be performed together with moving-image photography.

However, the above-described video camera (or video camera-integrated type VTR) having a still-image photography function has a number of problems which will be described below. In this kind of video camera, for example, the following three modes are available: (1) a mode for recording only a moving image in a moving-image recording area (the analog video signal recording area 5 of FIG. 2); (2) a mode for recording a moving image in the moving-image recording area and, at the same time, recording a still image selectively extracted from the moving image in a still-image recording area (the digital signal recording area 6 of FIG. 2); and (3) a mode for recording only a still image in the still-image recording area.

When either of the modes (1) or (2) is active, a moving image is recorded at all times, and it is possible to effectively utilize the entire recording area on the magnetic tape. During reproduction, an operator can view a reproduced image on a TV monitor or the like without experiencing any substantial problem. In contrast, the mode (3) is designed to record only a still image, and if the operator views a reproduced image after performing recording based on the mode (3), the operator will feel that a reproduced image is extremely uncomfortable, because no moving image is recorded in the portion of the magnetic tape on which a still image has been recorded in the mode (3). Furthermore, the mode (3) is uneconomical since it consumes a large amount of magnetic tape. In addition, since a moving image is suddenly disturbed during reproduction, the operator may feel uncomfortable. Particularly when the magnetic tape is made to transport at a high speed, a portion devoid of a reproduced image appears on the TV monitor so frequently that the operator feels visually, extremely uncomfortable.

Part (i) of FIG. 3 shows the state of recording on a magnetic tape in which image signals of three kinds based on the above-described three modes are recorded. Parts (ii) and (iii) of FIG. 3 show timings associated with moving-image recording and those associated with still-image recording, respectively, and Part (iv) shows tape-travel control executed on the basis of the timings shown in Parts (ii) and (iii). Part (i) shows the state of recording which has been made on the magnetic tape in accordance with the timings shown in Parts (ii), (iii) and (iv). In Part (i), MV and SV represent a moving-image recording area and a still-image recording area, respectively.

Initially, when moving-image recording is started at a timing t1, tape travel is initiated, and a moving image is sequentially recorded in the analog signal recording areas MV of a plurality of tracks until the timing of the end of the moving-image photography. Thus, as shown in Part (i) of FIG. 3, a scene A including fields A1 to An is sequentially recorded by one field in each track as an analog signal between the timing t1 and a timing t2. If an instruction to extract a still image is inputted at a timing t3 between the timing t1 and the timing t2, a field image in a field Ai at that timing is recorded as a still image in the digital still image recording areas SV of a plurality of tracks during a predetermined time duration (T0).

The tape travel is stopped at the timing t2. When an instruction to record only a still image is inputted at the next timing t4, the tape travel is restarted and continued until the predetermined time duration T0 passes after the timing t4. Thus, a still image B captured at the timing t4 is recorded in the still image recording areas SV of a plurality of tracks as shown in Part (i) of FIG. 3.

Then, a still image C captured at a timing t6 is similarly recorded until a timing t7 during only the predetermined time duration T0. When this recording is ended, the tape travel stops at the timing t7.

If moving-image recording is restarted at a timing t8, the tape travel is restarted and the moving-image recording is carried out, and operations similar to those executed in recording the scene A are carried out (if a still image D is to be extracted at a timing t10, similar operations are carried out).

Referring to the portion of the moving-image recording area MV that corresponds to the portion of the still-image recording area SV in which the still images B and C are recorded, no moving-image data is recorded in that portion of the moving-image recording area MV over a time duration of 2T0. Accordingly, if the magnetic tape is reproduced, the previously-described problems will take place.

In the case of a camera-integrated type VTR capable of recording a digitized high-quality still image in a PCM recording area of a VTR tape (or magnetic tape), it is common practice to dispose a release button for PCM still-image recording, such as a camera's release button, in addition to a recording button for ordinary recording of a moving image.

However, a scene which the operator desires to preserve as a PCM still image is not necessarily a scene which the operator has recorded by pressing the release button at his own will. There are also some cases where the operator unexpectedly encounters a rare scene and fails to preserve it as a PCM still image.

In addition, in the case of the reproduction of an image which has been recorded on a magnetic tape by a video camera-integrated type VTR having the above-described still-image photography function, since an image recorded in the moving-image recording areas of a plurality of tracks on the magnetic tape is merely continuously reproduced, it is impossible to determine at what point in time a picture was recorded as a still image.

To aid in making such a decision, a predetermined marker may be recorded concurrently with the recording of a moving image. However, even if the marker is displayed while a moving image is being continuously reproduced, it is substantially impossible to instantaneously grasp the contents of a recorded still image since the contents of the reproduced moving image consistently vary one after another during display.

SUMMARY OF THE INVENTION

It is, therefore, an object of the present invention to solve the above-described problems experienced with an apparatus for recording an analog video signal and a digital still image signal on the same recording medium.

Another object of the present invention is to prevent any substantial problem from occurring during reproduction of an analog video signal by this kind of apparatus.

To achieve the above-objects, according to one aspect of the present invention, there is provided a video signal recording apparatus which comprises recording means for recording a signal while forming a multiplicity of tracks on a recording medium, the multiplicity of tracks each having a first area and a second area which are separated from each other, moving-image signal forming means for forming an analog moving-image signal to be recorded in the first area, still-image signal forming means for forming a digital still-image signal to be recorded in the second area, and switching means for controlling the moving-image signal forming means and the still-image signal forming means to switch the apparatus between a plurality of modes. This plurality of modes include a first mode for recording the analog moving-image signal in the first area and the digital still-image signal in the second area, and a second mode for recording not the analog moving-image signal but a predetermined signal in the first area and the digital still-image signal in the second area.

Another object of the present invention is to make it possible to record a multiplicity of still images including a desired still image without wasting a still-image recording area in the aforesaid kind of apparatus.

To achieve the above-described objects, according to another aspect of the present invention, there is provided a video signal recording apparatus which comprises first recording means for recording video signals in individual first areas respectively provided in a multiplicity of tracks on a recording medium, second recording means for recording digital still-image signals in individual second areas each of which is separated from an associated one of the first areas in the multiplicity of tracks, and controlling means for causing the first recording means to repeatedly record an analog still-image signal representative of an image identical to an image represented by the digital still-image signals, in the first areas during a predetermined time duration in synchronism with the second recording means recording the digital still-image signals.

Another object of the present invention is to make it possible to correctly grasp the presence or absence of a recorded still image and the contents thereof during the reproduction of analog moving-image signals.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below in detail with reference to the accompanying drawings.

Figure 1:
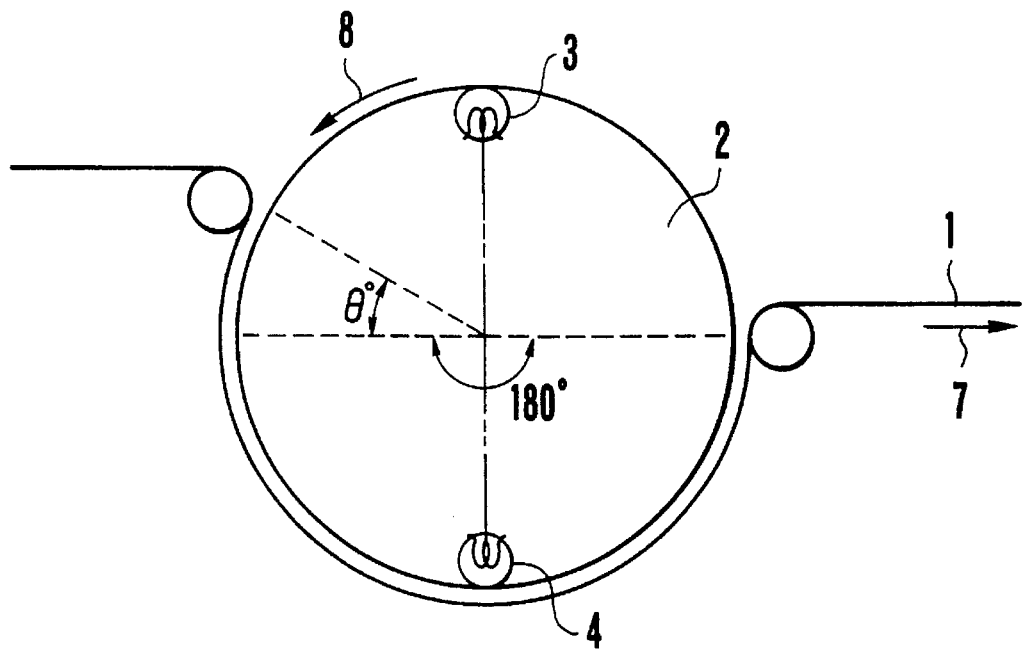
FIG. 1 is a schematic view showing a tape transporting system for use in a conventional VTR.
Figure 2:
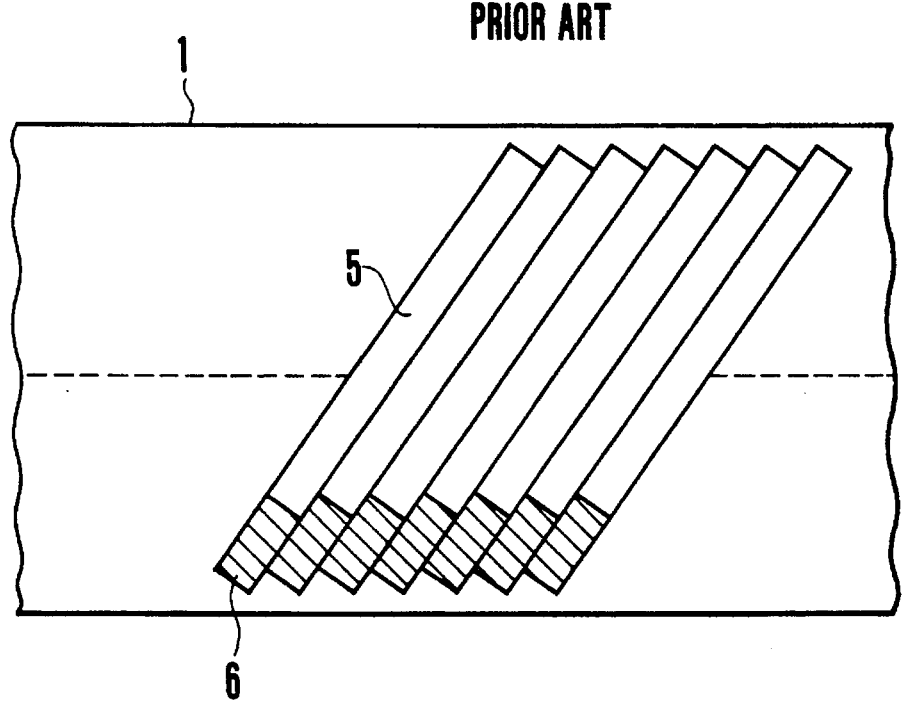
FIG. 2 is a schematic view showing the loci of recording formed on a magnetic tape by the conventional VTR.
Figure 3:
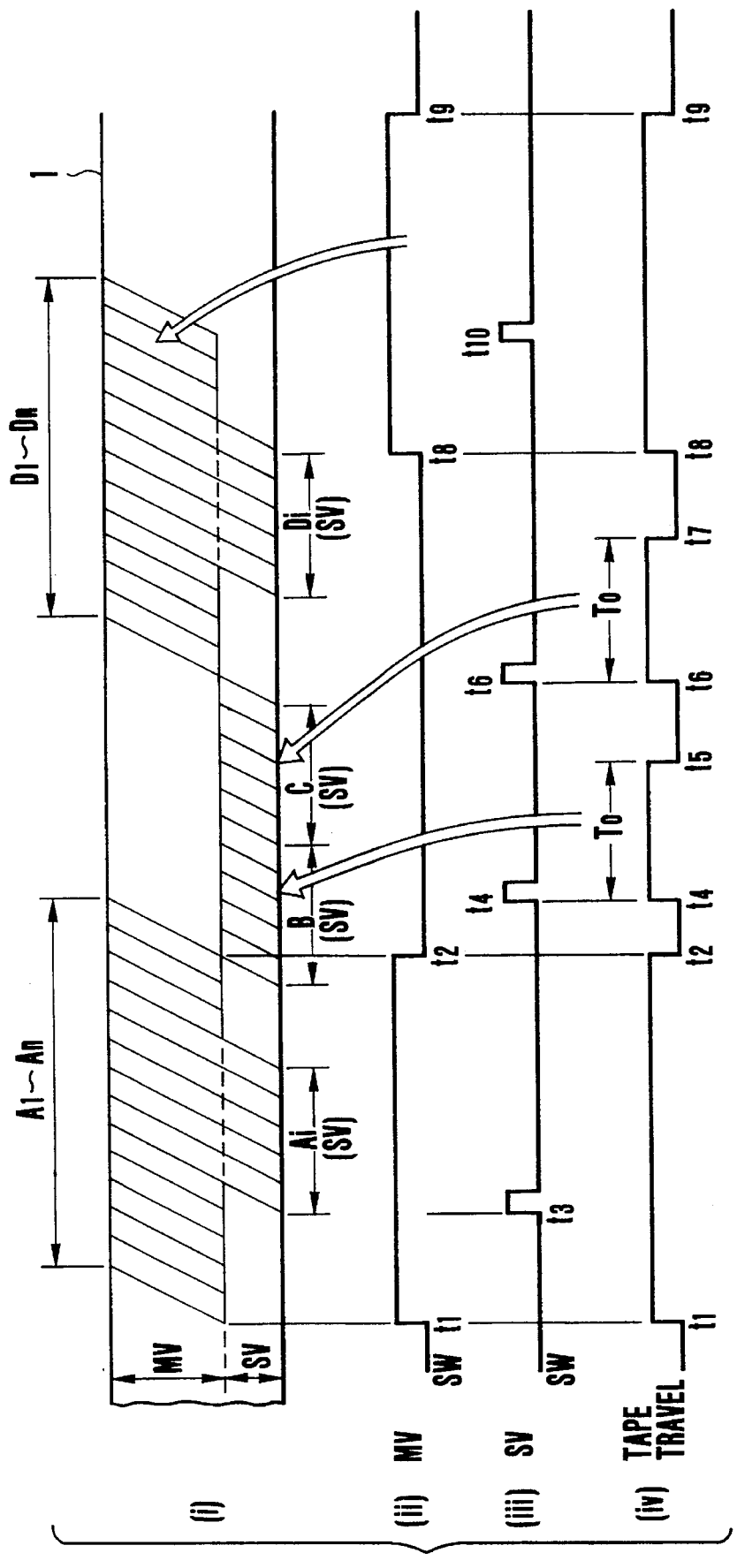
FIG. 3 is a diagram showing one example of the state of recording formed on the magnetic tape by the VTR of FIGS. 1 and 2.
Figure 4:
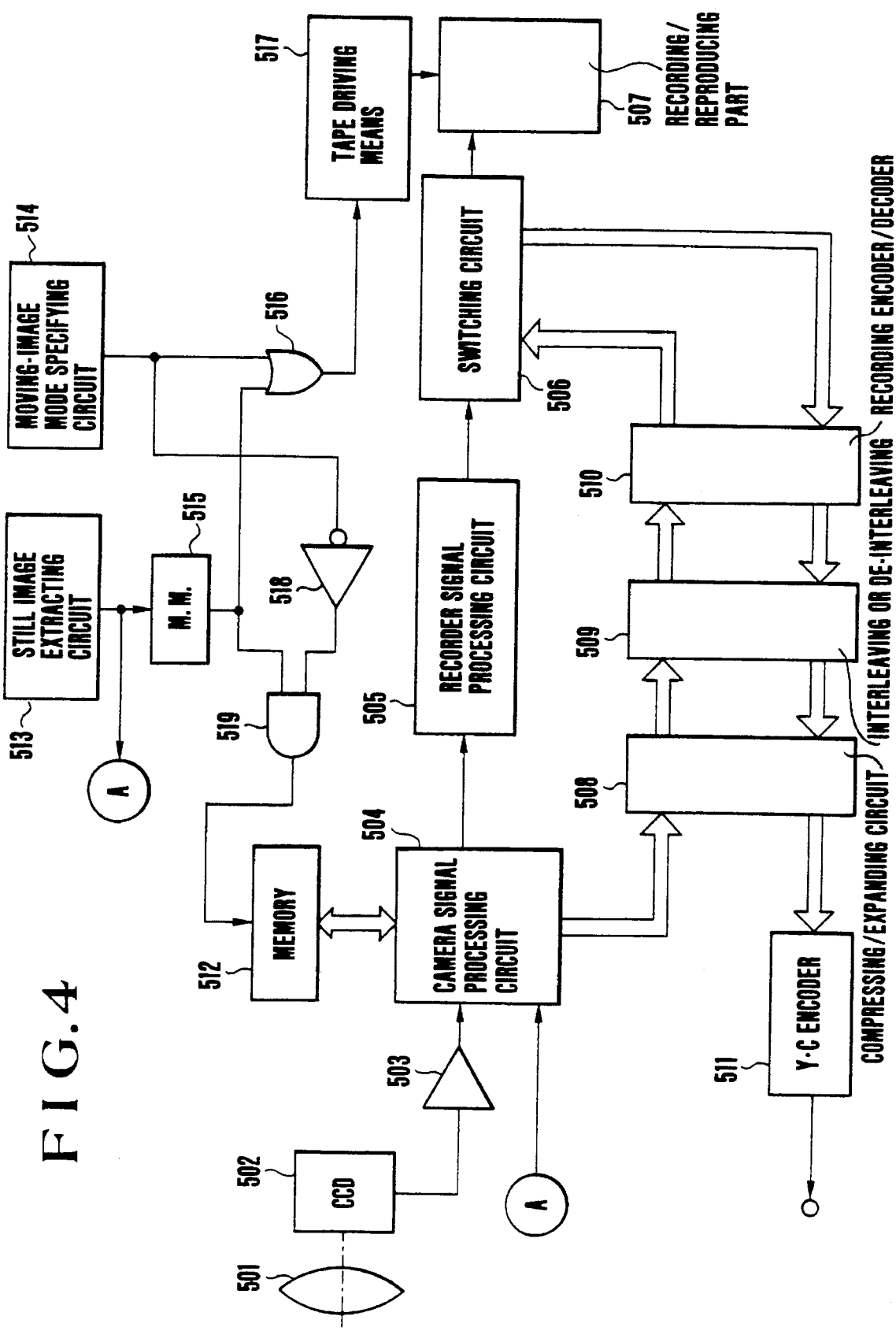
FIG. 4 is a schematic block diagram showing the arrangement of a video signal recording apparatus according to one embodiment of the present invention.

FIG. 4 is a block diagram schematically showing a video camera according to a first embodiment of the present invention. As shown in FIG. 4, a subject image is focused on a CCD (image sensor) 502 by a lens 501, and the focused subject image is photoelectrically converted by the CCD 502. The signal outputted from the CCD 502 is inputted to a camera signal processing circuit 504 via an amplifier 503, where after the input signal has been converted into a digital form, the digital signal is subjected to digital computations and, then, to D/A conversion. The analog signal outputted from the camera signal processing circuit 504 is inputted to a recorder signal processing circuit 505. The recorder signal processing circuit 505 performs signal processing to convert the input analog signal into a form suitable for recording on a magnetic tape. The signal outputted from the recorder signal processing circuit 505 is inputted to a recording/reproducing part 507 via a switching circuit 506.

The digital signal formed in the camera signal processing circuit 504 by the digital computations is supplied to a compressing/expanding circuit 508 by an amount corresponding to one picture at a time in accordance with a still-image extract signal inputted from a still image extracting circuit 513 which will be described later. The amount of information of the digital signal is compressed by the compressing/expanding circuit 508, and the compressed digital signal is subjected to interleaving processing and error-correcting code adding processing in a digital processing circuit 509 provided for performing interleaving processing and error-correcting code adding processing or de-interleaving processing and error-correcting processing. The signal outputted from the digital processing circuit 509 is converted into a signal form optimum for recording by a recording encoder/decoder 510. The signal outputted from the recording encoder/decoder 510 is inputted to the recording/reproducing part 507 via the switching circuit 506.

The recording/reproducing part 507 records the analog signal (i.e., a moving image) inputted from the recorder signal processing circuit 505 in the video signal (analog signal) recording area MV of each track on the magnetic tape, and the digital signal (i.e., a still image) inputted from the recording encoder/decoder 510 in the digital signal recording area SV of each track on the magnetic tape.

Figure 5:
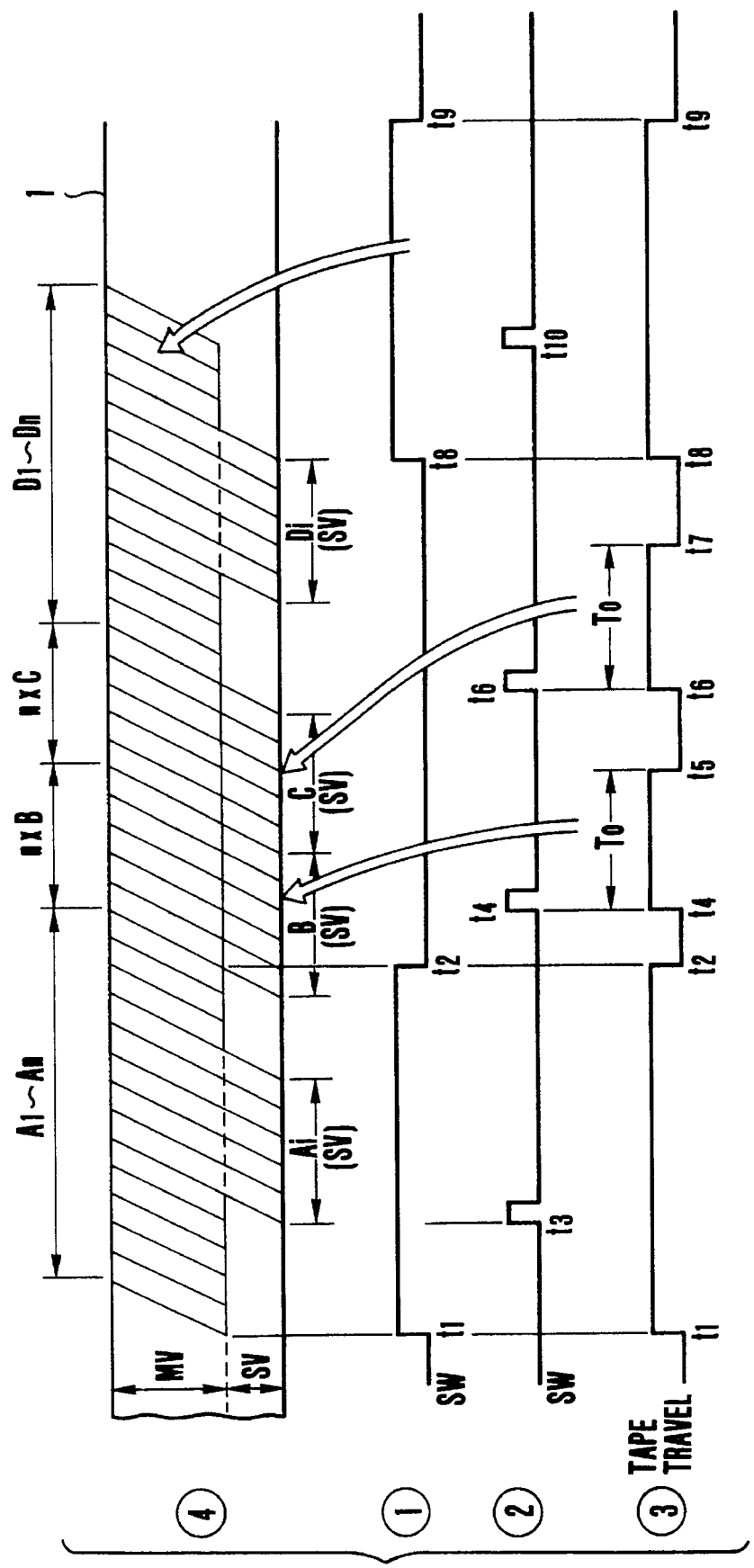
FIG. 5 is a diagram showing one example of the state of recording formed on a magnetic tape by the VTR of FIG. 4.

FIG. 5 is a view showing the state of recording which has been made on the magnetic tape by the apparatus of FIG. 4, and waveforms associated with various timing operations.

Referring again to FIG. 4, a memory 512 is added to the camera signal processing circuit 504, and stores still-image information for one picture which has been extracted from continuous digital moving-image signals taken from the camera signal processing circuit 504. The camera signal processing circuit 504 can also repeatedly input still-image information from the memory 512 to the recorder signal processing circuit 505. The still image extracting circuit 513 generates a still-image extract signal, such as that shown in Part ② of FIG. 5, in accordance with a manual operation, and inputs the still-image extract signal to a monostable multivibrator circuit 515. The monostable multivibrator circuit 515 outputs a signal, which continues by a predetermined time duration T0, in response to the signal inputted from the still image extracting circuit 513. A moving-image mode specifying circuit 514 generates a control signal for tape travel, such as that shown in Part ③ of FIG. 5, and inputs the control signal to a tape driving means 517 of the recording/reproducing part 507 through an OR gate 516 to control the tape driving means 517. The output signal of the monostable multivibrator circuit 515 is also inputted to the OR gate 516. The output signal of the moving-image mode specifying circuit 514 is also applied to an inverter 518, where it is inverted and formed into a non-moving-image mode state signal. The non-moving-image mode state signal is inputted to an AND gate 519 together with the output signal of the monostable multivibrator circuit 515, thereby controlling the readout operation of the memory 512.

While the AND gate 519 is on (the circuit 514 is off), still-image information stored in the memory 512 at that time is repeatedly read from the memory 512, and each of the repeatedly read still-image information is converted into an analog signal by the camera signal processing circuit 504 and the same information is repeatedly inputted to the recorder signal processing circuit 505. Accordingly, if a still-image extract signal is generated at a time t4 as shown in FIG. 5, the monostable multivibrator circuit 515, the OR gate 516 and the tape driving means 517 are controlled to cause the magnetic tape to travel, and digital still-image signals corresponding to a scene B, which are outputted from the recording encoder/decoder 510, are recorded in digital signal recording areas of a plurality of tracks (indicated by "SV" in Part ④ of FIG. 5) on the magnetic tape. At the same time, still-image information for n tracks corresponding to a predetermined time duration T0 is read from the memory 512 and converted into analog still-image signals, and the analog still-image signals are recorded in video signal recording areas (indicated by "MV" in Part ④ of FIG. 5) of the n tracks on the magnetic tape. This operation is similarly applied to the next scene C as shown in FIG. 5. Thus, moving images and still images are continuously recorded in the video signal recording areas of a multiplicity of tracks, so that a continuous reproduced output can be visually displayed on a TV monitor or the like by reproducing the moving images and still images which have been recorded on the magnetic tape in the above-described manner. Reproduction by the recording/reproducing part 507 is carried out in the following manner: A reproduced output is obtained from the digital signal recording area of a particular track on the magnetic tape, and is then passed through the switching circuit 506. The output of the switch circuit 506 is decoded by the recording encoder/decoder 510 and the decoded signal is subjected to de-interleaving processing, error-correcting processing and error-concealing processing in the digital processing circuit 509. The amount of information of the signal outputted from the digital processing circuit 509 is expanded by the compressing/expanding circuit 508 and is then converted into an ordinary analog video signal by the Y.C encoder 511. The Y.C encoder 511 outputs the ordinary analog video signal.

Figure 6:
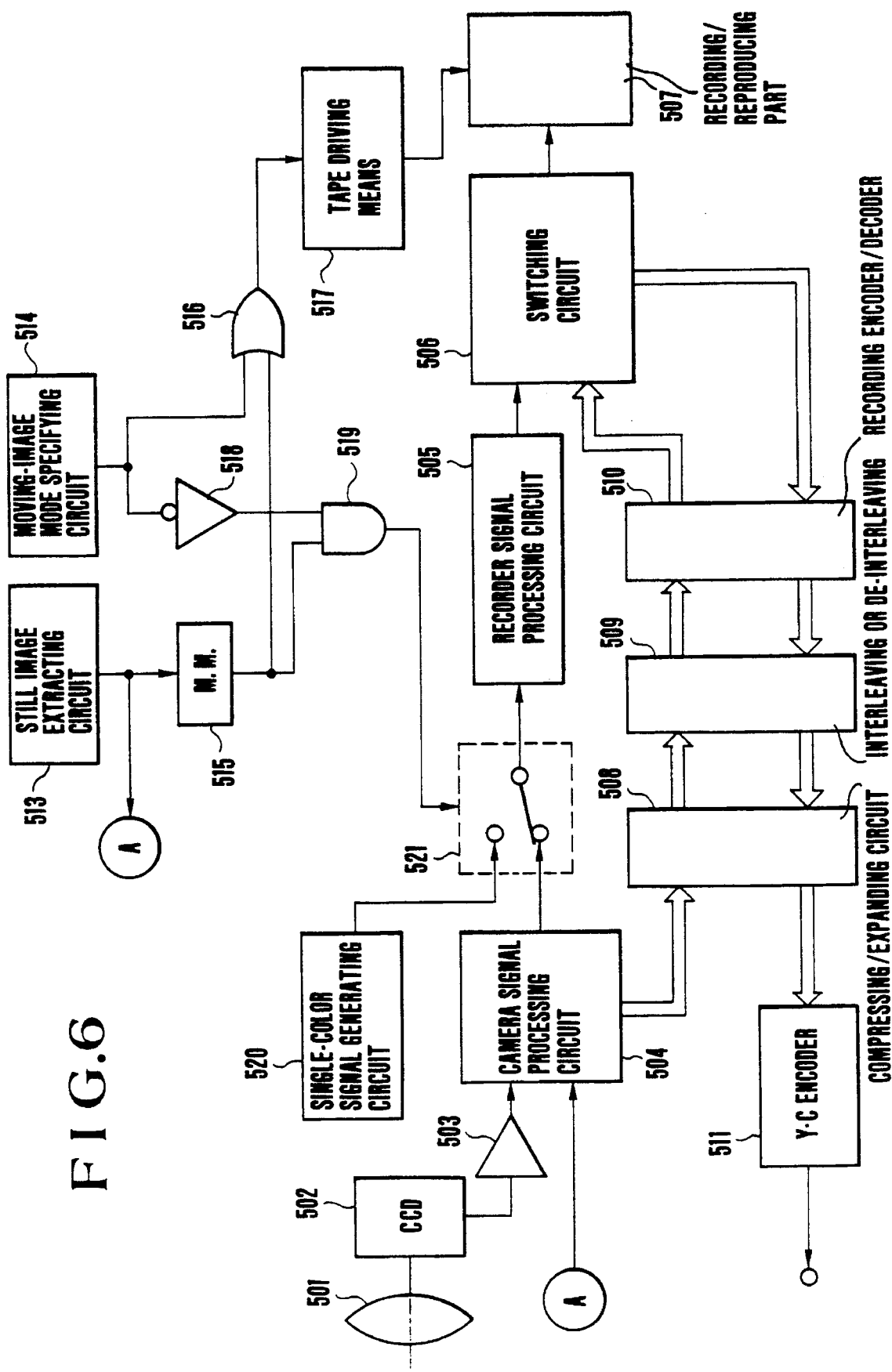
FIG. 6 is a schematic block diagram showing the arrangement of a video signal recording apparatus according to another embodiment of the present invention.

FIG. 6 shows another embodiment of the present invention, and in FIG. 6, identical reference numerals are used to denote elements identical to those shown in FIG. 4 and description is omitted for the sake of simplicity.

Referring to FIG. 6, a single-color signal generating circuit 520 is arranged to output a signal which serves to color the entire picture, for example, only blue. When the AND gate 519 outputs an off signal, the switch 521 is switched to an output side leading to the camera signal processing circuit 504. The still image extracting circuit 513 generates a still-image extract signal to turn on the AND gate 519, thereby switching the switch 521 to an output side leading to the single-color signal generating circuit 520. Thus, a single-color signal is recorded in the video signal recording areas of particular tracks on the magnetic tape (a still image is recorded in the corresponding digital signal recording areas). In this manner, moving images and still images (single-color still images) can be continuously recorded in the video signal recording areas of a multiplicity of tracks on the magnetic tape.

As described above, in the apparatus described in connection with FIGS. 4 to 6, even if a mode for carrying out only still-image recording is selected, an image signal is recorded in each of the corresponding video (analog) signal recording areas of the magnetic tape, whereby no substantial problem occurs even during moving-image reproduction.

Figure 7:
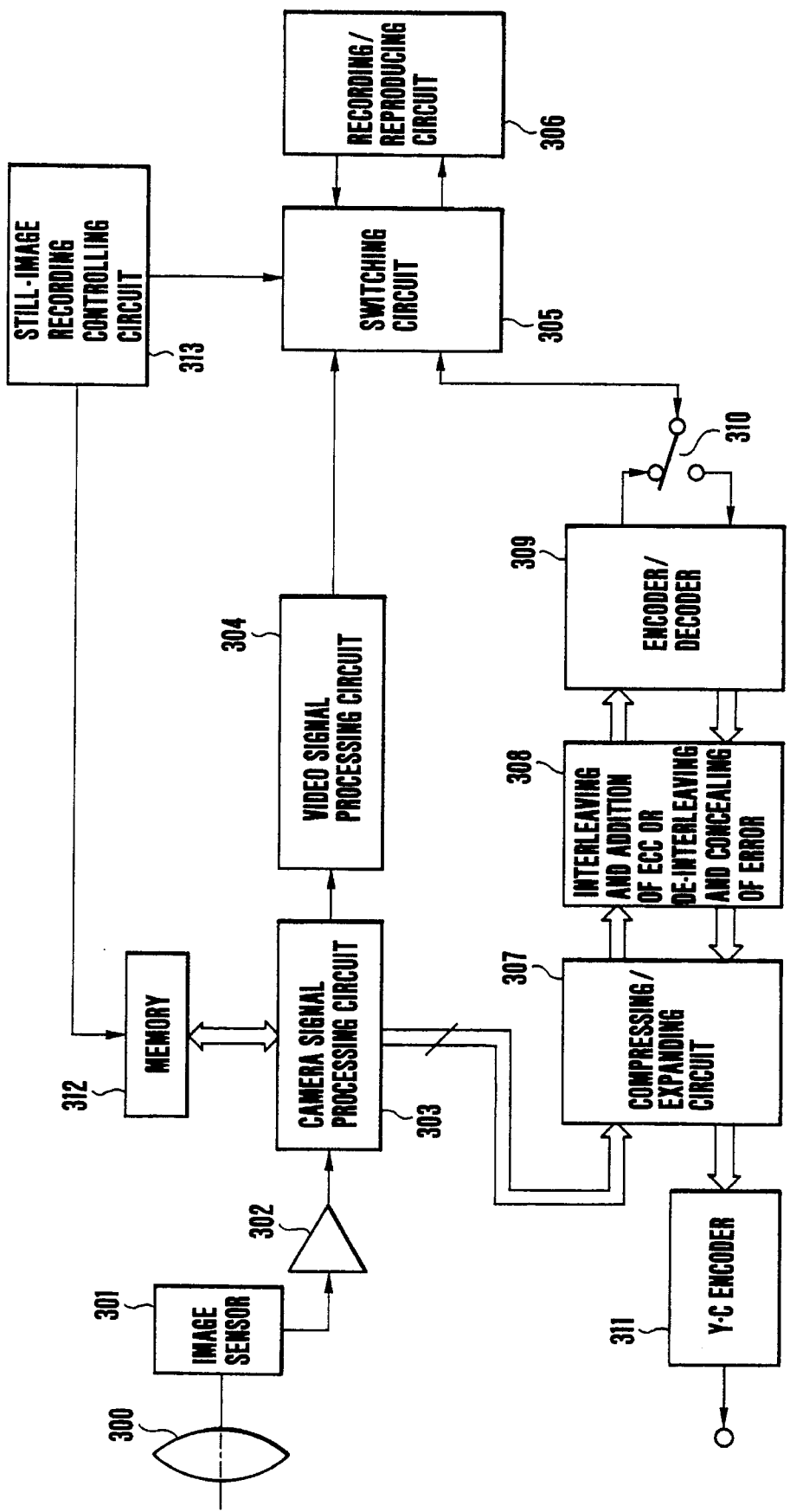
FIG. 7 is a schematic block diagram showing the arrangement of a video signal recording apparatus according to another embodiment of the present invention.

FIG. 7 is a schematic block diagram showing a video signal recording apparatus according to another embodiment of the present invention. Referring to FIG. 7, an optical system 300 is provided for focusing a subject image on an image sensor 301, and the subject image is converted into an electrical signal by the image sensor 301. The electrical signal is supplied to a preamplifier 302 and, then, to a camera signal processing circuit 303. In the case of moving-image recording, the signal outputted from the camera signal processing circuit 303 is converted into an analog video signal of signal format suitable for recording, by a video signal processing circuit 304. The analog video signal is supplied to a recording/reproducing circuit 306 via a switching circuit 305. In the case of still-image recording, a digital signal for one picture taken from the camera signal processing circuit 303 is supplied to and compressed by a compressing/expanding circuit 307. The compressed digital signal is supplied to an encoder (encoder/decoder) 309 through a digital processing circuit 308 which serves as an interleaving and ECC (error-correcting code) adding circuit. In the encoder 309, the compressed signal is converted into a digital signal of signal format suitable for recording. The resultant digital signal is supplied to the switching circuit 305 through a recording/reproduction selecting switch 310. The digital signal outputted from the switching circuit 305 is recorded on the magnetic tape (not shown) by the recording/reproducing circuit 306.

During reproduction, the aforesaid circuits 307, 308 and 309 serve as an expanding circuit, a de-interleaving and error-concealing circuit and a decoder, respectively. A reproduced still-image signal which has been expanded by the circuit 309 is converted into an ordinary television signal by the Y.C encoder 311.

The camera signal processing circuit 303 is connected to a memory 312 so that information for one picture is memorized.

A still-image recording controlling circuit 313 is arranged to control timings associated with still-image recording and those associated with moving-image recording, as well as the memory 312.

Figure 8:
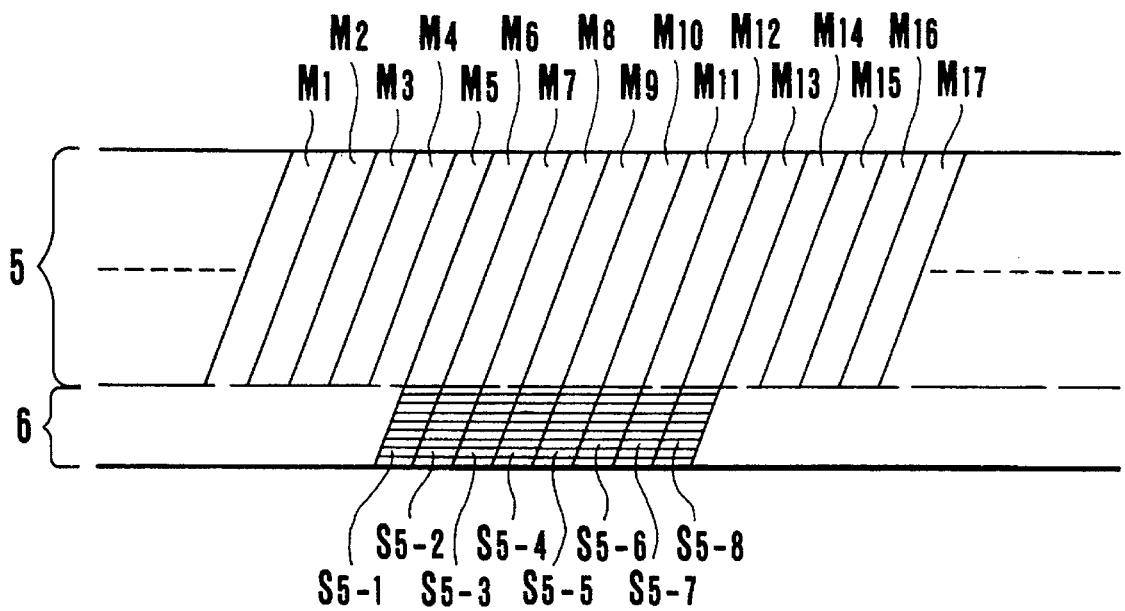
FIGS. 8 and 9 are schematic views aiding in explaining the advantage of the apparatus of FIG. 7.
Figure 9:
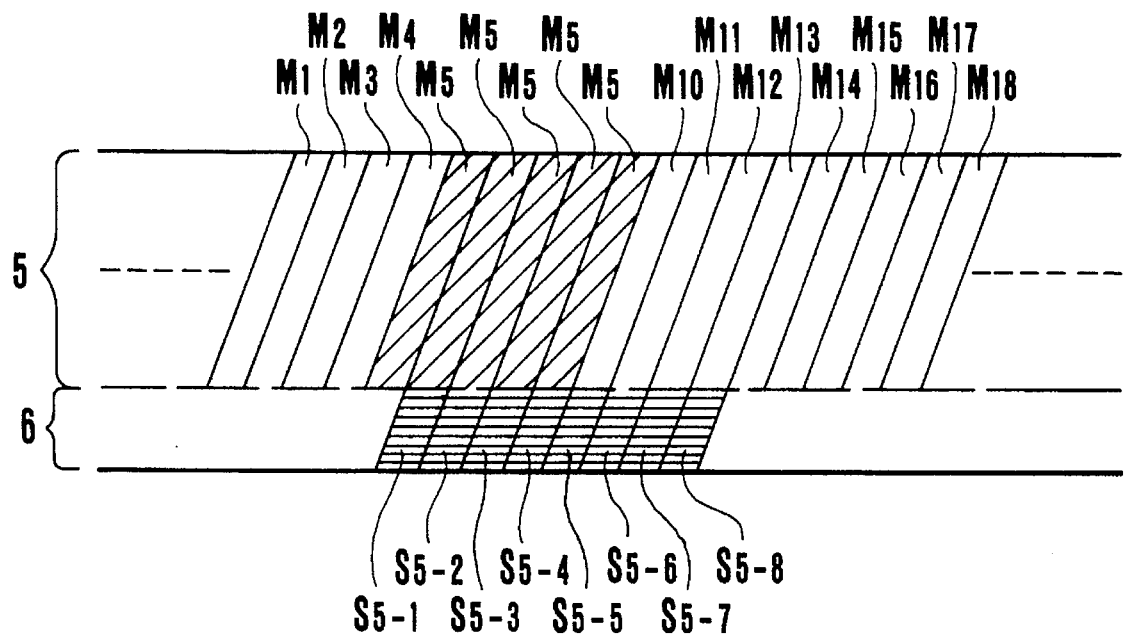

FIGS. 8 and 9 are views aiding in explaining the advantages of the above-described embodiment, and show different recording patterns formed on the magnetic tape. FIG. 8 shows a conventional format for moving-image recording and still-image recording. As shown in FIG. 8, pictures are continuously recorded in the respective moving-image recording areas 5 of tracks M1 to M17 of FIG. 8 by one field for each track. If it is assumed that the picture (scene) recorded in the track M5 is extracted for recording in the still-image recording area 6, the picture for one field in the track M5 is recorded in the respective still-image recording areas 6 of eight tracks S5-1 to S5-8 in such a manner that the picture for one field is divided into eight parts.

During reproduction of the magnetic tape recorded in the above-described manner, since only the moving-image recording area 5 of each track is reproduced, the scene in the track M5 is merely instantaneously reproduced so that it is impossible for an operator to visually confirm the substantial contents of the scene.

To cope with this problem, in the embodiment shown in FIG. 9, one picture in the track M5 is recorded in the still-image recording areas 6 of the respective tracks S5-1 to S5-8 in such a manner that such one picture is divided into eight parts, while the contents of the track M5 are recorded in the moving-image recording area 5 of each of tracks M6 to M9 for four fields.

Since recording such as that shown in FIG. 9 is carried out, the still-image recording controlling circuit 313 controls the readout operation of the memory 312 so that still-image information representative of the scene in the track M5 is transmitted from the memory 312 to the video signal processing circuit 304 over the associated field period.

In addition, since recording such as that shown in FIG. 9 is carried out, a frozen still image is displayed during only a particular time duration so that the operator can easily confirm the timing when the still image was recorded and the contents thereof, merely by monitoring the contents of the moving-image recording areas 5 of the respective tracks.

As is apparent from the above description, in the apparatus according to the embodiment explained in connection with FIGS. 7 to 9, one picture at a certain instant during the recording of a moving image is recorded as a still image in particular still-image recording areas, and at the same time the still image is continuously recorded in the corresponding moving-image recording areas as well during only a predetermined time duration. Accordingly, it is possible to realize a magnetic recording apparatus which permits an operator to easily understand the contents and recording timing of a picture recorded as a still image during the reproduction of a moving image.

Figure 10:
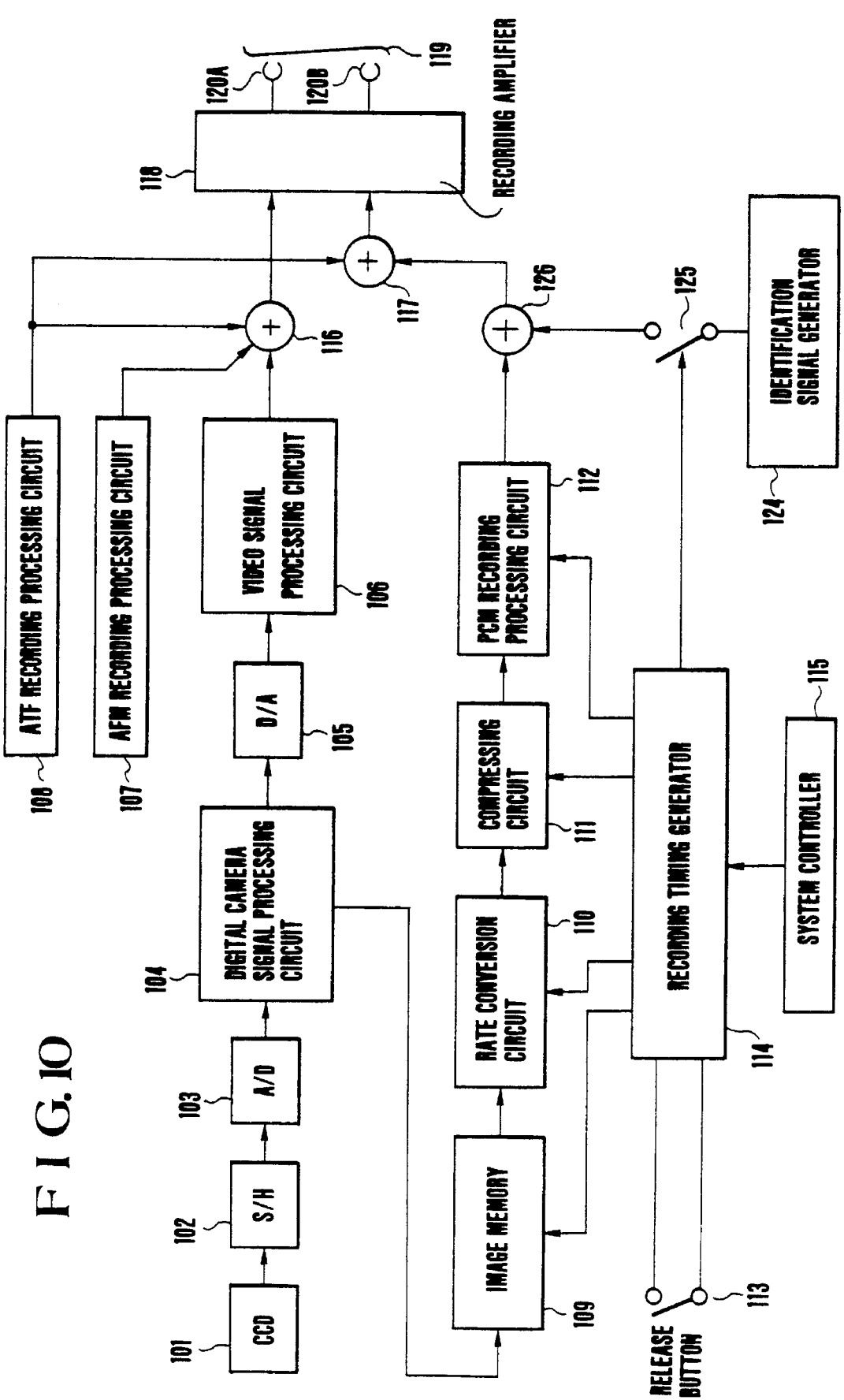
FIG. 10 is a schematic block diagram showing the arrangement of a video signal recording apparatus according to another embodiment of the present invention.

FIG. 10 is a schematic block diagram showing the arrangement of a camera-integrated type VTR according to another embodiment of the present invention. In the shown arrangement, a subject image is converted into an electrical signal by a CCD 101 which serves as an image sensor, and the electrical signal is converted into a digital signal by a sample-and-hold circuit 102 and an A/D circuit 103. The digital signal is then subjected to predetermined processing such as gamma-correction processing and matrix processing for forming a luminance signal and color-difference signals, in a digital camera signal processing circuit 104. The thus-processed signal is converted into an analog signal by a D/A conversion circuit 105 for the purpose of forming a video recording signal, and the analog signal is converted into a signal suitable for recording, by a video recording processing circuit 106. The signal outputted from the video recording processing circuit 106 is applied to an adder 116.

An AFM recording processing circuit 107 produces a recording signal representative of a sound inputted through a microphone (not shown), while an ATF recording processing circuit 108 produces a pilot signal for use in known tracking. These signals are mixed with the analog video recording signal in the adder 116, and the mixed signal is transmitted to a recording amplifier 118.

A recording timing generator 114 is arranged to generate the timing signals required to control a process which starts with extraction of a still image and ends with recording of data in a PCM recording area 123. The shown construction also includes a release button 113, a system controller 115 for controlling the entire apparatus, an identification signal generator 124 and a switch (SW) 125.

In the case of a regular recording operation, while a moving-image recording instruction is given, a still-image recording instruction is periodically outputted from the recording timing generator 114. A luminance signal and color-difference signals for one picture are read from the digital camera signal processing circuit 104 to an image memory 109. The information outputted from the memory 109 is applied to a rate conversion circuit 110, where the data rate (the amount of information per unit time) of the information is converted so that the information can be recorded in the respective PCM recording areas 123 of a plurality of tracks. The data (the amount of information) outputted from the rate conversion circuit 110 is compressed by a compressing circuit 111, and the compressed signal is subjected to predetermined processing such as error detection, addition of an error-correcting code, an ID code, a block address, etc., and interleaving processing in a PCM recording processing circuit 112. The signal outputted from the PCM recording processing circuit 112 is supplied to an adder 117 via an adder 126, and the supplied signal is mixed with an ATF signal in the adder 117 and the signal outputted from the adder 117 is supplied to the recording amplifier 118. The signal is then recorded in the respective PCM recording areas 123 of a plurality of tracks on a magnetic tape 119 by heads 120A and 120B. If it is assumed that the number of tracks required to record a still image for one picture is N, inclusive of the number of guard tracks, the recording timing generator 114 causes extraction of the still image to be executed at intervals of the time duration required to effect recording for N tracks. The regular recording operation is continued by repeating similar processing.

Figure 11:
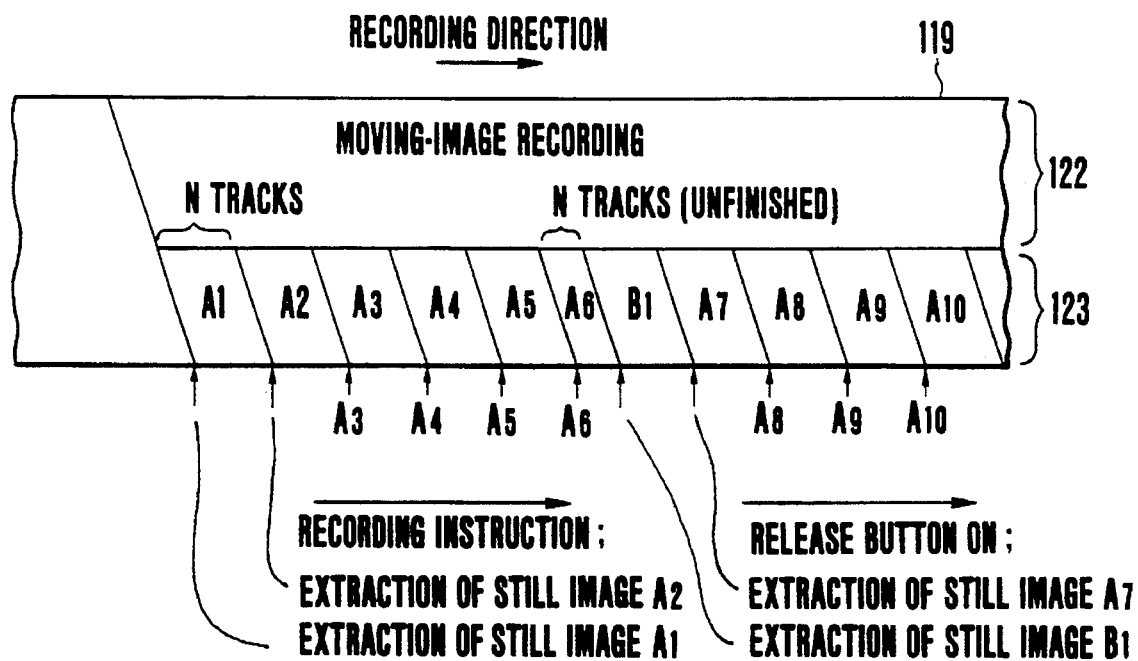
FIGS. 11 and 12 are schematic views showing the state of the start portion of a recording which is made on a magnetic tape by the apparatus of FIG. 10.

FIG. 11 shows the state of recording which is made on a magnetic tape when an occasional recording operation is carried out. Referring to FIG. 11, while a moving-image recording instruction is given, a still image A1 is extracted and stored into the memory 109, and the still image A1 is recorded over N tracks in the respective PCM recording areas 123 thereof through the above-described processing. Then, a still image A2 is extracted and stored into the memory 109 so that the still image A2 can be subsequently recorded. During moving-image recording, a recording operation continues to be carried out regularly periodically in the order of still images A3, A4, . . . However, if the operator is to intentionally record a still image at a desired instant, the operator presses the release button 113 to execute an occasional recording operation. The above and following operating timings are controlled by the recording timing generator 114.

When the release button 113 is pressed, storage of a still image into the memory 109 at that time is started even if the time duration required to effect recording for N tracks has not yet passed since the timing when a still-image extraction was started in the regular recording operation. For example, referring to FIG. 11, if the release button 113 is pressed during the recording of data representative of a still image A6, a still image B1 is stored into the memory 109 and the process proceeds to recording of data representative of the still image B1 even if the recording of the still image A6 up to the N-th track has not yet been completed. At the same time, the switch 125 is closed and a signal outputted from the identification signal generator 124 is added to the data representative of the still image B1 in the adder 126, and the sum data is recorded. The signal from the identification signal generator 124 may be, for example, a pilot signal of single frequency which does not affect an ATF signal or PCM data.

Figure 12:
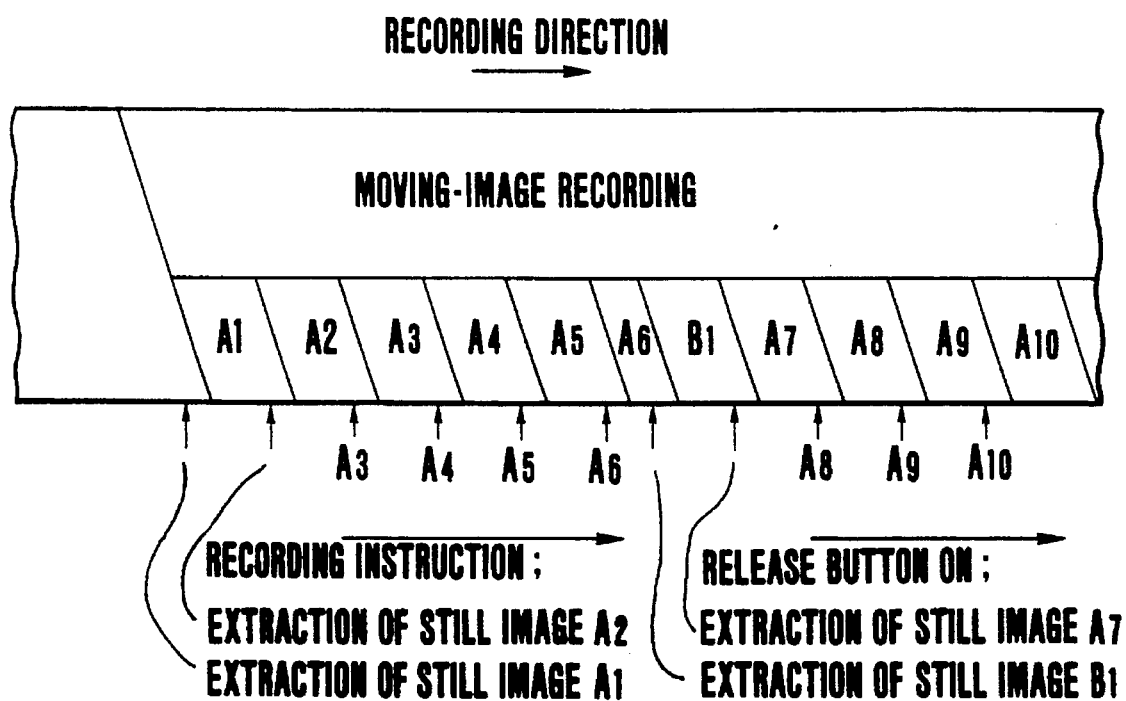

In the example shown in FIG. 11, each of the transition points between adjacent still-image data coincides with the point of extraction of each still image. However, as shown in FIG. 12, even if each of the transition points between adjacent still-image data does not coincide with (is offset from) the point of extraction of each still image, a similar function can be achieved.

Figure 13:
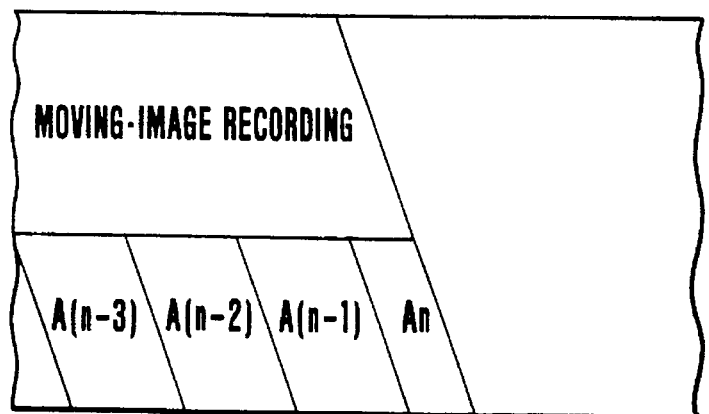
FIGS. 13 and 14 are schematic views showing the state of the end portion of the recording which is made on the magnetic tape by the apparatus of FIG. 10.
Figure 14:
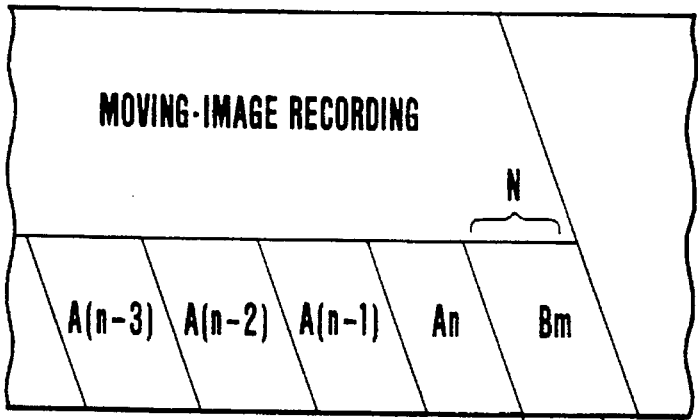

FIGS. 13 and 14 show the state of the end portion of the recording which is made on the magnetic tape, and an operation performed at the time of the end portion of the recording will be described below.

During the regular recording operation, when a recording stop instruction is given, the recording operation is stopped even if the recording of data representative of a still image An has not yet been completed. During the occasional recording operation, even if a recording stop instruction is given, if the recording of data representative of a still image Bm is in process, the recording operation is stopped after the completion of the recording of the data representative of the still image Bm. Of course, these operations are also controlled by the recording timing generator 114.

Figure 15:
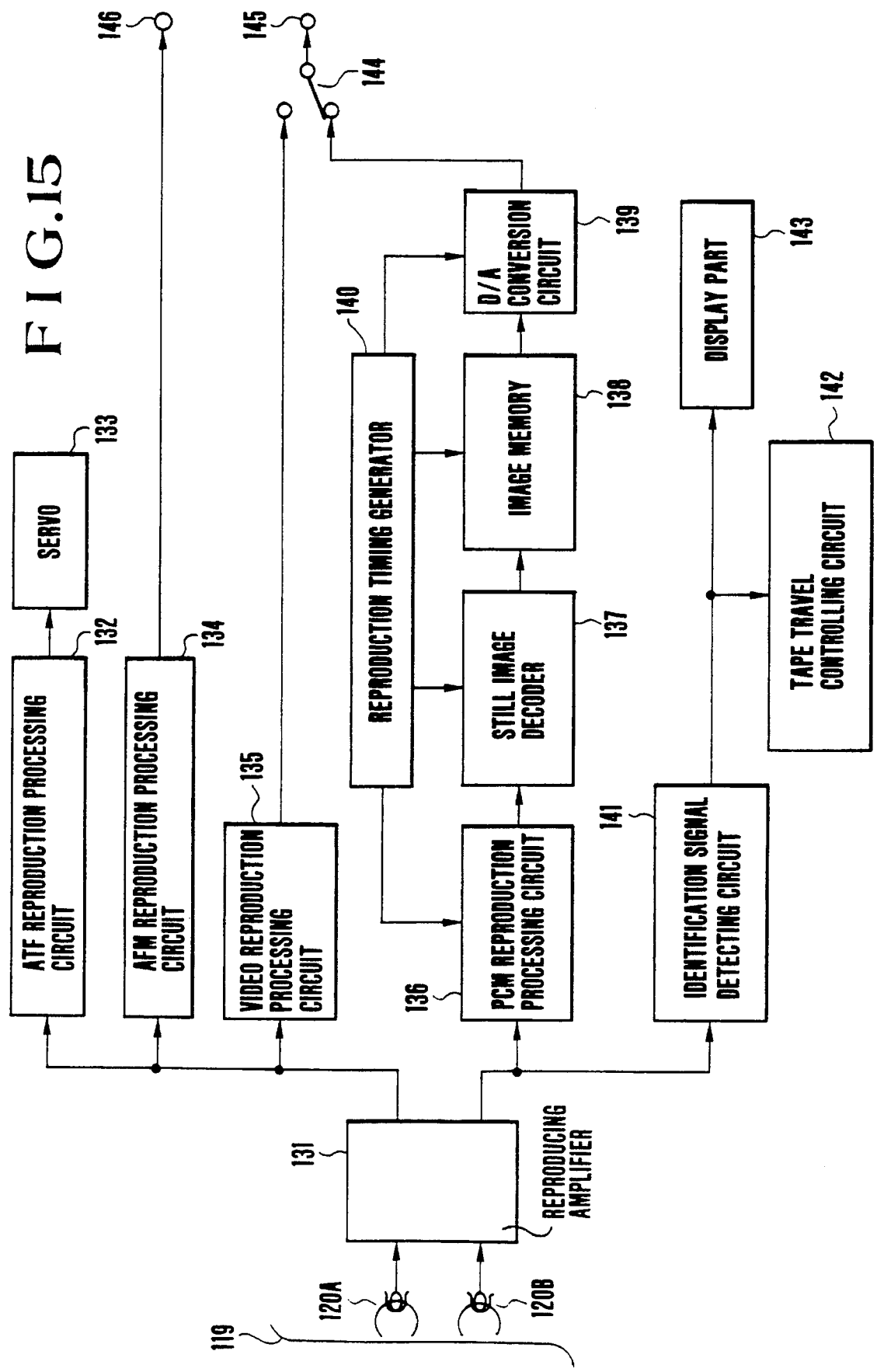
FIG. 15 is a schematic block diagram showing the arrangement of an apparatus for reproducing a signal recorded by the apparatus of FIG. 10.

FIG. 15 is a schematic block diagram showing a system for reproducing a signal recorded by the apparatus of FIG. 10. Referring to FIG. 15, signals reproduced by heads 120A and 120B are amplified by a reproducing amplifier 131. The signal reproduced from a video signal area 122 of a particular track is passed to each of an ATF reproduction processing circuit 132, an AFM reproduction processing circuit 134 and a video reproduction processing circuit 135. Thus, a moving image and an associated sound are restored.

In the meantime, the signal reproduced from the PCM recording area 123 of the particular track is supplied to both of a PCM reproduction processing circuit 136 and an identification signal detecting circuit 141. The supplied signal is subjected to predetermined processing such as error detection, error correction and de-interleaving processing, in the PCM reproduction processing circuit 136, and the original still image is restored by a still-image decoder 137 and an image memory 138. The information read from the image memory 138 is converted into a signal suitable for output, for example, a composite signal, by a D/A converting circuit 139, and the resultant signal is supplied to a selecting switch (SW) 144 for selecting a moving image or a still image. A reproduction timing generator 140 is arranged to control the operating timings of the respective elements 136, 137, 138 and 139. A video output terminal 145 is an output terminal common to a moving image and a still image.

The identification signal detecting circuit 141 is made up of a band-pass filter, a detecting circuit and other associated circuits, and serves to detect an identification signal. The detection result provided by the identification signal detecting circuit 141 is displayed on a display part 143, whereby it is possible to determine whether a reproduced still image data is data based on the occasional recording or data based on the regular recording.

It is also possible to selectively search only data based on the occasional recording at a high speed. More specifically, a magnetic tape is made to travel at a high speed, and if an identification signal representative of the occasional recording is detected by a tape travel controlling circuit 142, the magnetic tape is stopped at that position and the corresponding data is reproduced from the start thereof. In this manner, it is possible to selectively search only still image data based on the occasional recording.

Figure 16:
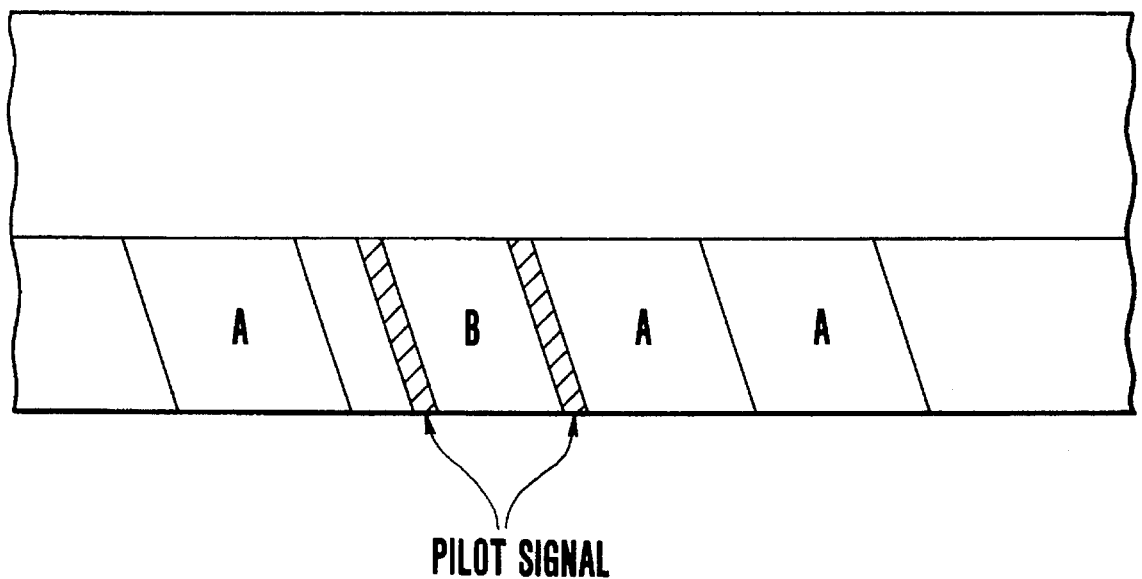
FIG. 16 is a schematic view aiding in explaining the recording of an identification code.

In the example explained in connection with FIGS. 10 to 15, a plurality of identification signals are added to the entire still-image data. However, as shown in FIG. 16, if identification signals are respectively added to positions preceding and following still-image data or to only a position preceding still-image data, a similar advantage can be achieved.

In the above-described embodiment, a pilot signal of single frequency is used as the identification signal. However, if the identification signal is inserted in the ID code data, a similar advantage can be achieved.

In the above-described embodiment, reference has been made to still-image recording using a camera-integrated type VTR. However, an image to be stored into the memory 109 may be a signal fed from a TV tuner or a TV signal inputted from a line input terminal. Accordingly, the present invention can also be applied to a deck type VTR.

As is apparent from the foregoing description, according to the present invention, it is possible to record still images at intervals of a predetermined period together with a moving image, whereby it is possible to greatly reduce the possibility that an operator fails to record a rare scene as a still image. In addition, it is also possible to carry out still-image recording at a desired timing.

In addition, during reproduction, it is possible to selectively search only still images recorded at desired timings, on the basis of an identification signal, from among the still images recorded at the desired timings and those recorded at intervals of a predetermined period.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. A video signal recording apparatus comprising:
   (a) recording means for recording a signal while forming a multiplicity of tracks on a recording medium, the multiplicity of tracks each having a first area and a second area which are separated from each other;
   (b) moving-image signal forming means for forming an analog moving-image signal to be recorded in the first area;
   (c) still-image signal forming means for forming a digital still-image signal to be recorded in the second area; and
   (d) switching means for simultaneously controlling said moving-image signal forming means, said still-image signal forming means and said recording means to switch said apparatus between a plurality of modes;
   the plurality of modes including:
      a first mode in which the analog moving-image signal is recorded in the first area; and
      a second mode in which the analog moving-image signal is not recorded but an analog still-image signal for one picture is automatically recorded in the first area a plurality of times while the digital still-image signal is recorded in the second area.

2. An apparatus according to claim 1, wherein the first mode includes a first sub-mode in which the digital still-image signal is not recorded in the second area and a second sub-mode in which the digital still-image signal is recorded in the second area.

3. An apparatus according to claim 1, wherein the analog still-image signal represents an image identical to an image represented by the digital still-image signal.

4. An apparatus according to claim 3, wherein the analog still-image is automatically recorded a plurality of times in the first areas of tracks having the second areas in which the digital still-image signal is recorded once.

5. An apparatus according to claim 3, wherein said recording means records the analog moving-image signal for one picture in one track, and the digital still-image signal for one picture in n tracks (n is an integer not less than 2), the analog still-image signal being repeatedly recorded by n times in the second mode.

6. An apparatus according to claim 1, wherein the analog still-image signal represents an image independent of an image represented by the digital still-image signal.

7. An apparatus according to claim 6, wherein the analog still-image signal is automatically recorded a plurality of times in the first areas of tracks having the second areas in which the digital still-image signal is recorded once.

8. An apparatus according to claim 6, wherein said recording means records the analog moving-image signal for one picture in one track, and the digital still-image signal for one picture in n tracks (n is an integer not less than 2), the analog still-image signal being repeatedly recorded by n times in the second mode.

9. An apparatus according to claim 6, wherein the analog still image signal represents a single-color image.

10. A video signal recording apparatus, comprising:
    (a) first recording means for recording a moving-image signal in first areas respectively provided in a multiplicity of tracks on a recording medium;
    (b) second recording means for recording a digital still-image signal in second areas which are respectively separated from the first areas in the multiplicity of tracks; and
    (c) controlling means for simultaneously controlling said first recording means and said second recording means; said controlling means causing an analog still-image signal for one picture to be automatically recorded a plurality of times instead of the moving-image signal on the first areas correspondingly located the second areas on which the digital still-image signal is recorded once.

11. An apparatus according to claim 10, wherein said controlling means causes said first recording means to automatically record the analog still-image signal a plurality of times, representative of an image identical to an image represented by the digital still-image signal, in the first areas while said second recording means is recording the digital still-image signal in the second areas.

12. An apparatus according to claim 10, wherein said controlling means causes said first recording means to automatically record the analog still-image signal a plurality of times, representative of a single-color image, in the first areas while said second recording means is recording the digital still-image signal in the second areas.

13. A video signal recording apparatus, comprising:
 (a) first recording means for recording a moving image signal in first areas respectively provided in a multiplicity of tracks on a recording medium;
 (b) second recording means for recording a digital still-image signal in second areas which are respectively separated from the first areas in the multiplicity of tracks; and
 (c) controlling means for simultaneously controlling said first and second recording means, said controlling means causing said first recording means to automatically record an analog still-image signal a plurality of times instead of the moving-image signal in the first areas during a predetermined time duration in synchronism with said second recording means recording the digital still-image signal.

14. An apparatus according to claim 13, wherein said first recording means automatically records the analog still-image signal for one picture in one track and said second recording means records the digital still-image signal for one picture in n tracks (n is an integer not less than 2).

* * * * *